US011313160B1

(12) United States Patent
Osaki et al.

(10) Patent No.: US 11,313,160 B1
(45) Date of Patent: Apr. 26, 2022

(54) RECEPTACLE LATCHING MECHANISM INCORPORATING A GO-GAUGE

(71) Applicant: Toyota Motor Engineering & Manufacturing North America, Inc., Plano, TX (US)

(72) Inventors: Keita Osaki, Cambridge (CA); Takanori Shirota, Waterloo (CA); Chris C. Daigle, London (CA); Ross W. Groat, Delhi (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/341,901

(22) Filed: Jun. 8, 2021

(51) Int. Cl.
  *E05C 3/12* (2006.01)
  *E05B 65/52* (2006.01)
  *G01B 3/34* (2006.01)
  *B65D 90/66* (2006.01)

(52) U.S. Cl.
  CPC .......... *E05C 3/12* (2013.01); *B65D 90/66* (2013.01); *E05B 65/5253* (2013.01); *G01B 3/34* (2013.01); *E05Y 2900/602* (2013.01)

(58) Field of Classification Search
  CPC ....... E05C 3/12; E05B 65/5253; B65D 90/66; E05Y 2900/602; G01B 3/34
  See application file for complete search history.

(56) References Cited

U.S. PATENT DOCUMENTS

| 2,413,566 | A | * | 12/1946 | Hohwart | G01B 3/34 |
| | | | | | 33/555.2 |
| 3,958,448 | A | * | 5/1976 | Willis | G01N 3/12 |
| | | | | | 73/37 |
| 5,117,561 | A | * | 6/1992 | Greenslade | G01B 5/02 |
| | | | | | 33/549 |
| 9,518,812 | B2 | * | 12/2016 | Badhya | G01B 5/06 |
| 2013/0118080 | A1 | * | 5/2013 | Fink | E05F 15/00 |
| | | | | | 49/31 |
| 2016/0209198 | A1 | * | 7/2016 | Badhya | G01B 5/06 |

OTHER PUBLICATIONS

"Main Types of Limit Gauges (With Diagram) Metrology" article, found at: https://www.yourarticlelibrary.com/metrology/main-types-of-limit-gauges-with-diagram-metrology/95226 (accessed on Jan. 9, 2021).
Hopper Lids spec sheet, found at: https://www.hippohopper.com/self-dumping-hoppers/parts-and-accessories/hopper-lids/#/: (accessed on May 13, 2021).
Woodman's Parts Plus.com "Hopper Lid Latch" webpage, found at: https://www.woodmanspartsplus.com/66638/637767/Miscellaneous-Parts/Hopper-Lid-Latch.html: (accessed on May 13, 2021).

* cited by examiner

Primary Examiner — Bayan Salone
(74) Attorney, Agent, or Firm — Christopher G. Darrow; Darrow Mustafa PC

(57) ABSTRACT

A latching mechanism includes a gauge defining a passage extending therethrough, and a latch operably connected to the gauge and structured to be rotatable from a latching position to an unlatched position by movement of a component at least partially through the passage. The latch is structured to engage a latch engagement feature positioned on a lid of a receptacle to maintain the lid in a closed condition when the latch is in the latching position. The receptacle lid is released for opening when the latch disengages from the latch engagement feature.

12 Claims, 9 Drawing Sheets

RECEPTACLE LATCHING MECHANISM INCORPORATING A GO-GAUGE

TECHNICAL FIELD

The embodiments disclosed herein relate to latching mechanisms structured to be actuatable to maintain a lid of a receptacle in a closed condition and, more particularly, to a latching mechanism incorporating a go-gauge structured to selectively control release of the latching mechanism to enable opening of the receptacle lid.

BACKGROUND

Receptacles such as storage bins and hoppers may be used for storing and/or dispensing quantities of small, uniform components such as screws, nuts, bolts, and other items of hardware. Slight differences in the sizes or geometries of such items may not be easily determinable by a user, and this may lead to confusion as to whether a component should be placed in a receptacle containing components which may be similar, yet dimensionally different. If different components are stored in the same receptacle, this condition may not be discovered until someone attempts to use an incorrect component in an assembly, which may lead to down time and possible scrapping or time-consuming sorting of the components in the receptacle.

SUMMARY

In one aspect of the embodiments described herein, a latching mechanism includes a gauge defining a passage extending therethrough, and a latch operably connected to the gauge and structured to be rotatable from a latching position to an unlatched position by movement of a component at least partially through the passage. The latch is structured to engage a latch engagement feature positioned on a lid of a receptacle to maintain the lid in a closed condition when the latch is in the latching position.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a latching mechanism including a latch structured for engaging a latch engagement feature positioned on a lid of a receptacle to maintain the lid in a closed condition when a latch is in a latching position. The latch is structured to be rotatable between the latching position and an unlatched position in which the latch is disengaged from the latch engagement feature, enabling opening of the lid. The latching mechanism also includes a gauge defining a passage extending therethrough. The gauge is structured to admit only a component having specific dimensional characteristics into the passage. These specific dimensional characteristics are common to components currently being stored in the receptacle. If a sample component is unable to be inserted into the passage, it is determined to be of the wrong size, and therefor different from the components currently being stored in the receptacle. If the sample component is able to move into and along the passage, the component may pass through the gauge and drop into the receptacle. This serves as an indication that a group of common components from which the sample was taken may be stored in the receptacle. In addition, movement of the sample component through the passage and out of the gauge acts to rotate the latch, disengaging the latch from the latch engagement feature and enabling the receptacle lid to open. This enables the group of components to be inserted into the receptacle. Embodiments described herein also relate to a receptacle assembly incorporating an embodiment of the latching mechanism.

Figure 1A:
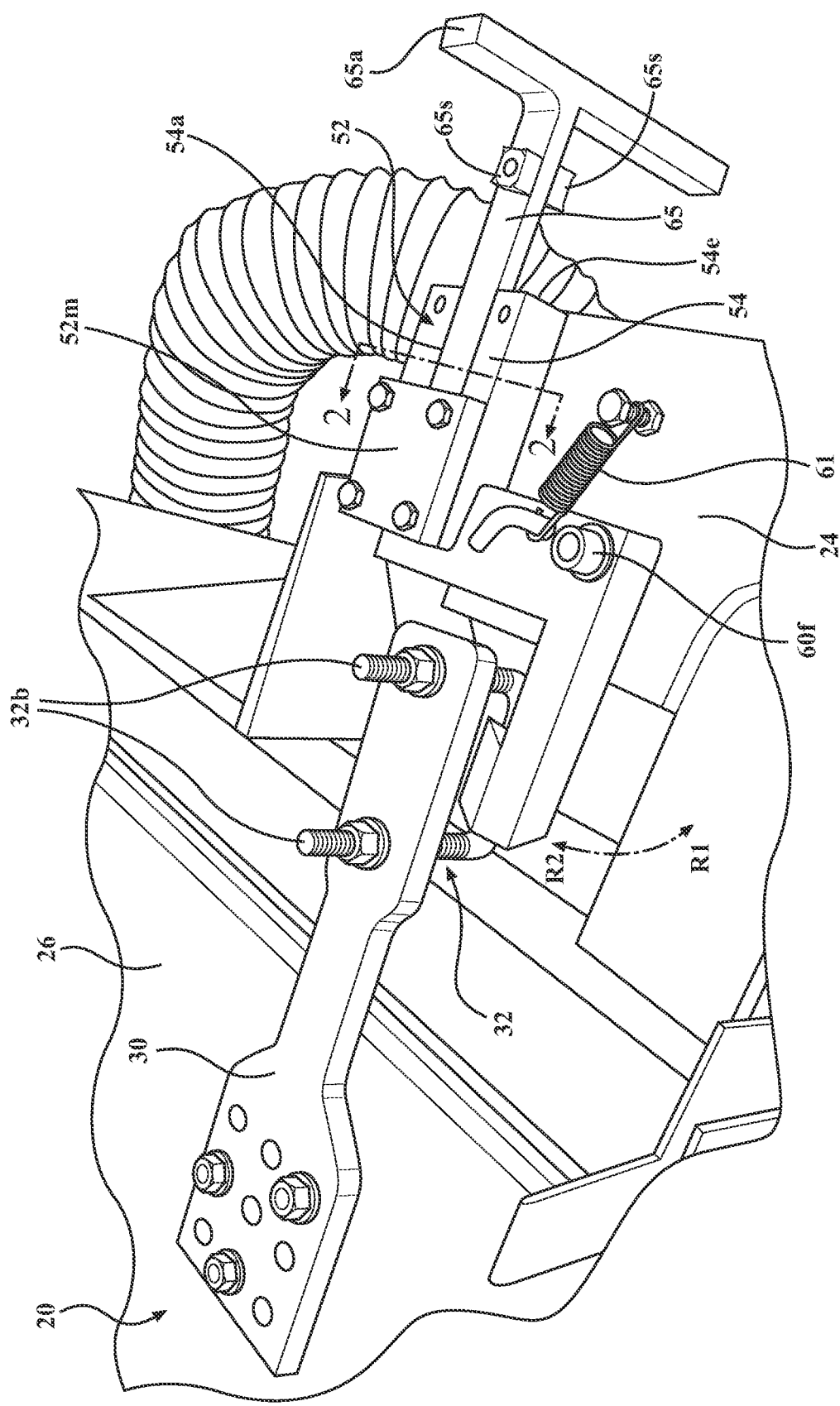
FIG. 1A is a schematic perspective view of a portion of a receptacle assembly incorporating a latching mechanism in accordance with an embodiment described herein.
Figure 1B:
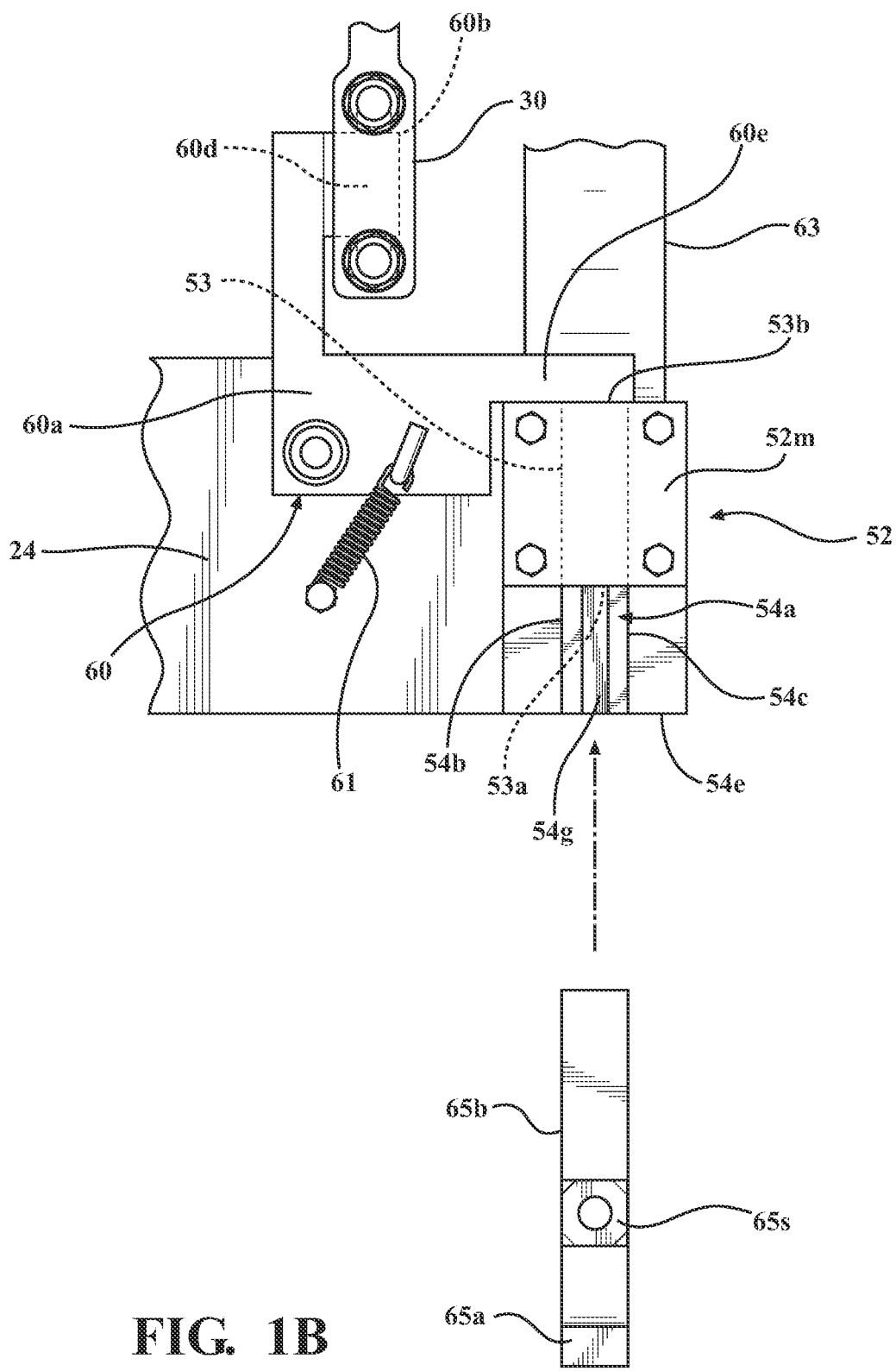
FIG. 1B is a schematic plan view of the portion of the receptacle assembly shown in FIG. 1A.
Figure 1C:
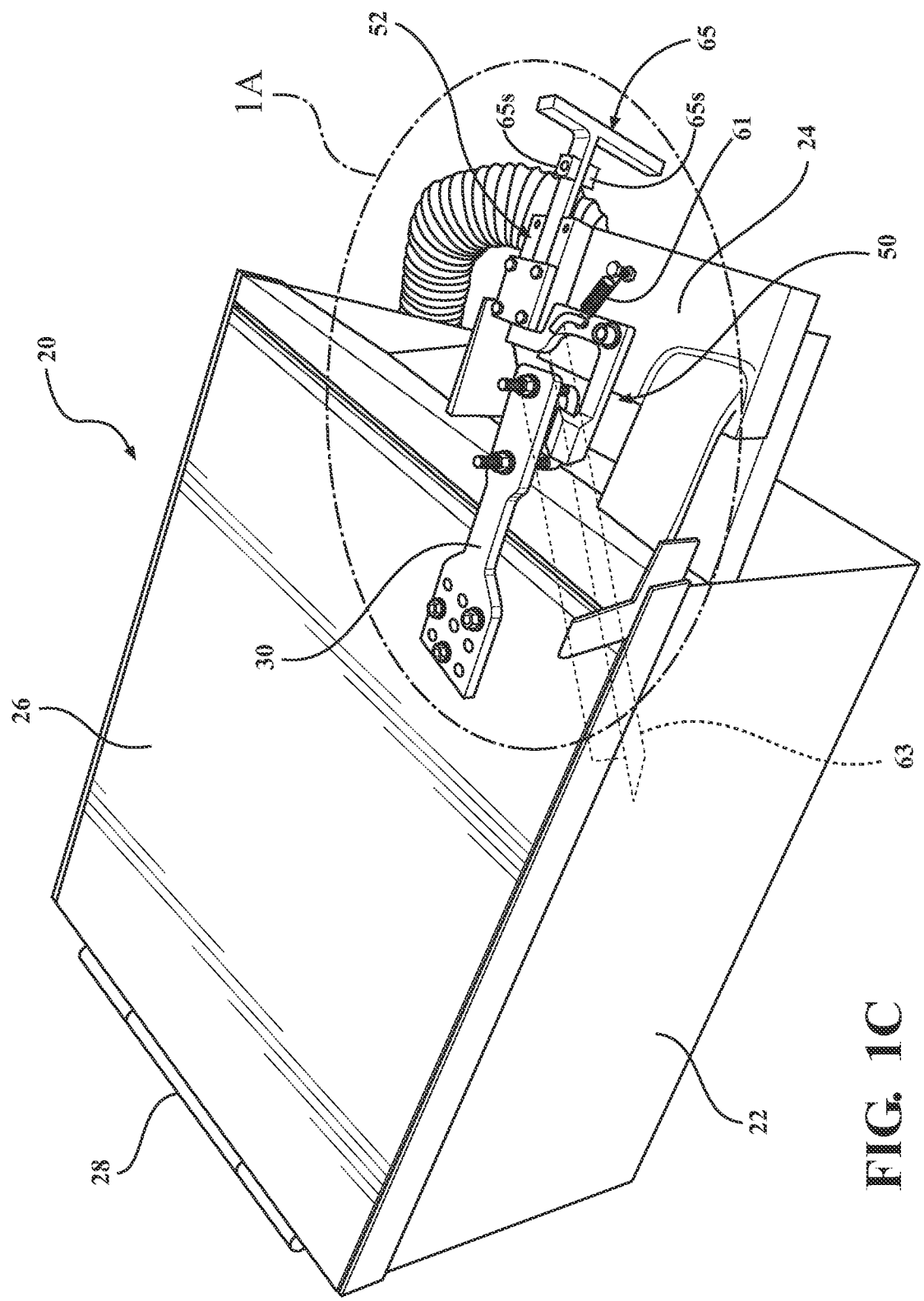
FIG. 1C is a schematic perspective view of the receptacle assembly if FIG. 1A.

Referring to FIGS. 1A and 1C, the receptacle assembly 20 may include a receptacle 22 suitable for storing and/or dispensing a quantity of uniform components, such as hardware components (nuts, bolts, washers, screws, etc.). In one or more arrangements, the receptacle 22 may have an open top to enable a large quantity of similar components to be deposited into the receptacle at one time.

The receptacle assembly 20 may also include a lid 26 structured to cover the open top of the receptacle 22, thereby restricting access to an interior of the receptacle. The lid 26 may be structured to be maintained in a closed condition by an embodiment of the latching mechanism described herein. In one or more arrangements, the lid 26 may be operably connected to the receptacle 22 by a spring-loaded hinge 28 structured to bias the lid 26 toward an open condition enabling access to the receptacle interior through the receptacle top opening when a latch of the latching mechanism is in an unlatched position. In one or more arrangements, the receptacle lid 26 may be structured so that contents of the receptacle are visible through the lid. In particular arrangements, the lid 26 may be formed from a transparent material.

The receptacle assembly 20 may also include a mounting base 24 operably connected to the receptacle 22 to enable mounting of various components and sub-assemblies thereto. In one or more particular arrangements, the mounting base 24 may be mounted along a side of the receptacle 22 to enable attachment of portions of a latching mechanism to the receptacle.

For purposes of maintaining the lid 26 in a closed condition, the lid 26 may have one or more latch engagement features of the latching mechanism operably connected thereto. Referring to FIGS. 1A, 1B, 3 and 4, the latch engagement features may include a clasp arm 30 operably connected to the receptacle lid 26. The clasp arm 30 may have holes structured for receiving therethrough a pair of threaded portions 32b of a catch 32 (described below).

Figure 8:
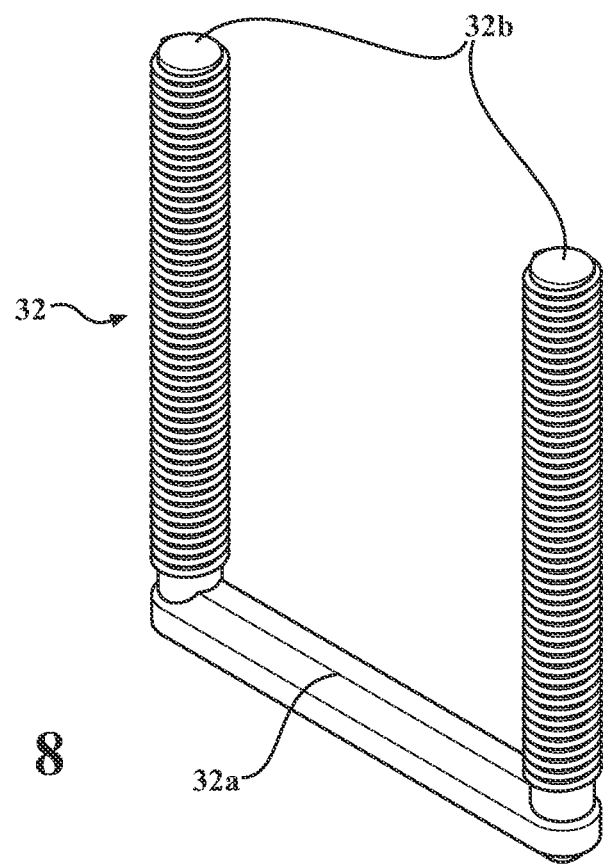
FIG. 8 is a perspective view of a catch in accordance with an embodiment described herein.

Referring to FIG. 8, the latch engagement features may also include a catch 32 structured for operable connection to the lid 26. The catch 32 may include a longitudinal base portion 32a and a threaded portion 32b extending from each end of the base portion. The threaded portions 32b may be inserted through holes formed in the clasp arm 30 and complementary nuts may be applied to the threaded portions 32b to secure the catch 32 to the clasp arm 30. The catch base portion 32a may be structured to engage a first projection 60b of the rotatable latch 60 (described in greater detail below) when the latch is rotated to a latching position of the latch. The engagement between the catch base portion 32a and the latch first projection 60b may secure the lid 26 in its closed condition against a lid-opening force exerted by the spring-loaded hinge 28. When the latch first projection 60b is disengaged from the catch base portion 32a, the spring-loaded hinge 28 may automatically operate to raise the lid 26 and open the receptacle.

In one or more arrangements, the latching mechanism 50 may include a gauge 52 defining a passage 53 extending therethrough. The gauge passage 53 may have a first end 53a and a second end 53b opposite the first end. The gauge 52 may be structured to receive a component 99 proposed to be stored in the receptacle 22 into the passage 53 at the first end 53a.

In one or more arrangements, the gauge 52 may be a "go-gauge" or "pass-through gauge". For purposes described herein, a "go-gauge" or "pass-through gauge" may be a gauge defining the passage 53 extending therethrough, the passage being structured with respect to a dimension of the component 99 so that the component is permitted to pass into, through, and out of the passage 53 if the dimension is at or below a predetermined value. For example, it may be intended to store in the receptacle a quantity of hardware components having specific structural and/or dimension characteristics (e.g., a large quantity of M5 nuts) that distinguish the component from other, similar components. The gauge 52 may be specifically tailored to enable an example of the desired component to pass through the gauge according to one or more features of the specific type, size, etc. of component intended to be stored in the receptacle.

Figure 2:
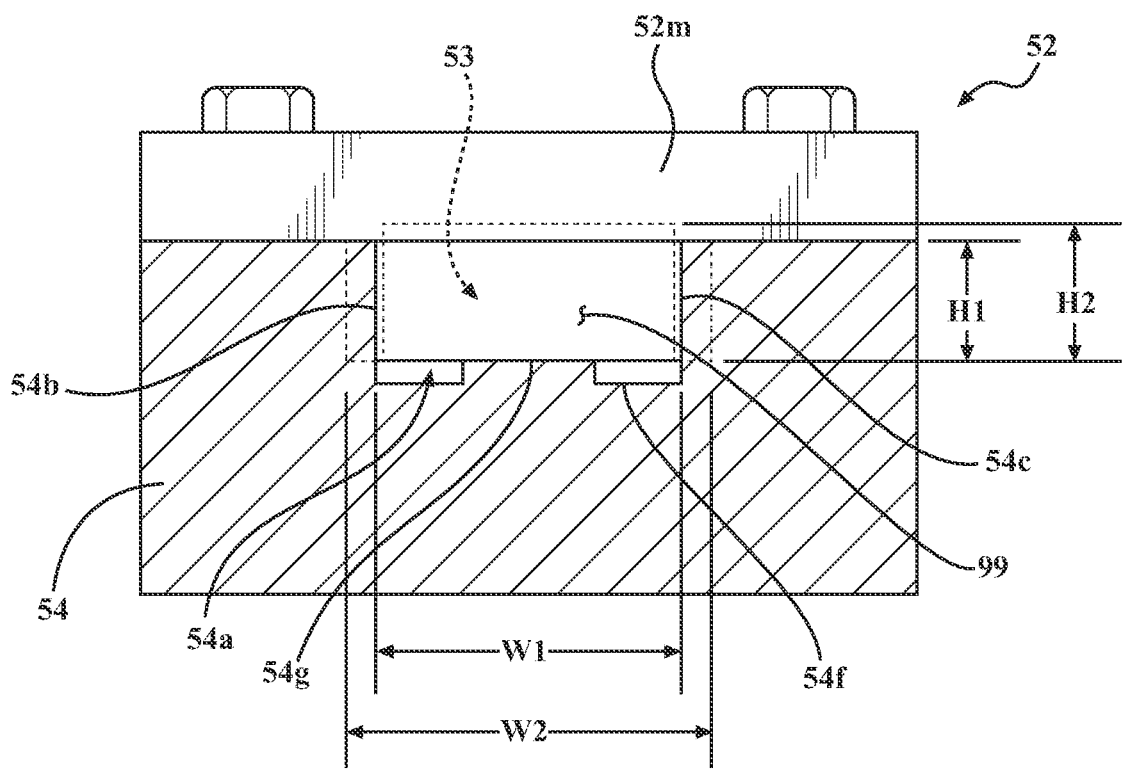
FIG. 2 is a schematic end view of an embodiment of a go-gauge suitable for incorporation into a latching mechanism in accordance with an embodiment described herein.

FIG. 2 is a schematic end view of an exemplary embodiment of a go-gauge 52 usable in the latching mechanism 50. Referring to the drawings and in particular to FIG. 2, in one or more arrangements, an embodiment of a go-gauge 52 usable in the latch mechanism described herein may include a receiving member 54 defining a receiving slot 54a. The receiving slot 54a may have a pair of opposed walls 54b, 54c and a partially elevated floor 54f extending between the opposed walls. A portion 54g of the floor 54f may be elevated to define a surface along which the component may be moved into the passage 53, and the location of which may be more precisely dimensionally controlled with respect to the cover 52m. This may aid in more precisely defining the passage dimension along which the component height dimension H extends, to enable the passage dimension to most closely match the height dimension H without falling below the maximum allowable height dimension H1, as described below.

The gauge 52 may also include a cover 52m structured to be attachable to the receiving member 54 so that the cover 52m is in direct physical contact with the opposed walls 54b, 54c and extends between the opposed walls. A space 52s residing between the opposed walls 54b, 54c, the cover 52m, and the floor 54f defines the passage 53 extending through the gauge. In addition, the opposed walls 54b, 54c may be spaced apart so as to form a close sliding fit with a component 99 allowed to pass between the walls when a first outer dimension of the component is at a maximum value of an acceptable range of values of the first outer dimension. The acceptable range of values may include values within a tolerance range of the first outer dimension (i.e., within an upper tolerance limit for the component dimension). In particular arrangements, the first outer dimension may be a width dimension or diameter of the component.

Also, the floor 54f and cover 52m may be structured to be spaced apart so as to form a close sliding fit with a component 99 allowed to pass between the floor and the cover when a second outer dimension of the component is at a maximum value of an acceptable range of values of the second outer dimension. The acceptable range of values may include values within a tolerance range of the second outer dimension. In particular arrangements, the second outer dimension may be a height dimension or thickness dimension of the component.

FIG. 2 also illustrates operating principles of the go-gauge 52. Element 99 represents a component having maximum width and height dimensions which will pass through the gauge (i.e., a component having dimensions at or below maximum tolerance limits for the respective dimension). In the gauge embodiment shown, the component 99 may have a height dimension H of up to a maximum of H1 and still fit through the passage 53 (assuming that the width dimension of the component will fit into the passage). For a component having a height dimension of H1 that is at the maximum tolerance limit for the dimension, the component will form a close sliding fit with the floor 54f and the cover 52m as the component passes through the passage 53 between the floor and the cover. If the component height dimension is at any value H2 exceeding H1, the component 99 will not fit into the passage 53.

Also, in the gauge embodiment shown, the component 99 may have a width dimension W of up to a maximum of W1 and still fit through the passage 53 (assuming that the height dimension of the component will fit into the passage). For a component having a width dimension of W1 that is at the maximum tolerance limit for the dimension, the component will form a close sliding fit with the opposing walls 54b, 54c as the component passes through the passage 53 between the walls. If the component width dimension is at any value W2 exceeding W1, the component will not fit into the passage.

Figure 6:
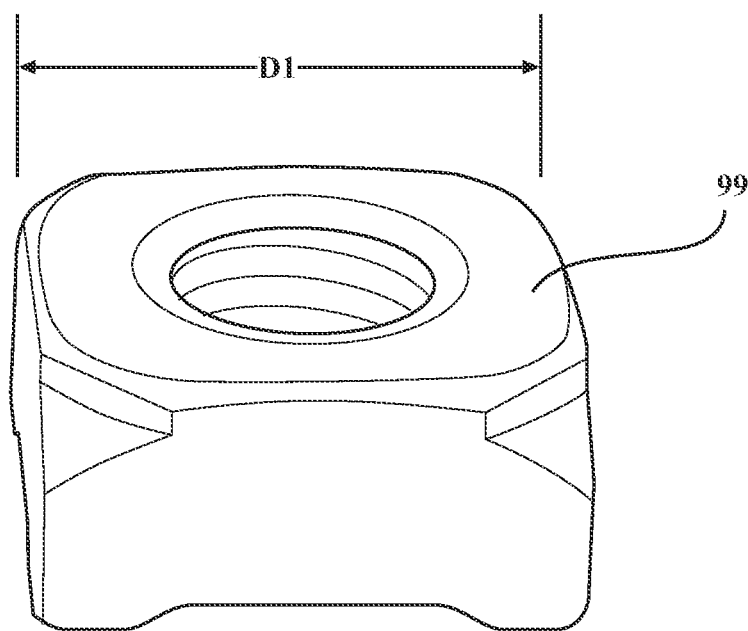
FIG. 6 is a perspective view of one example of a component in the form of a nut that may be passed through a gauge in accordance with an embodiment described herein.
Figure 7:
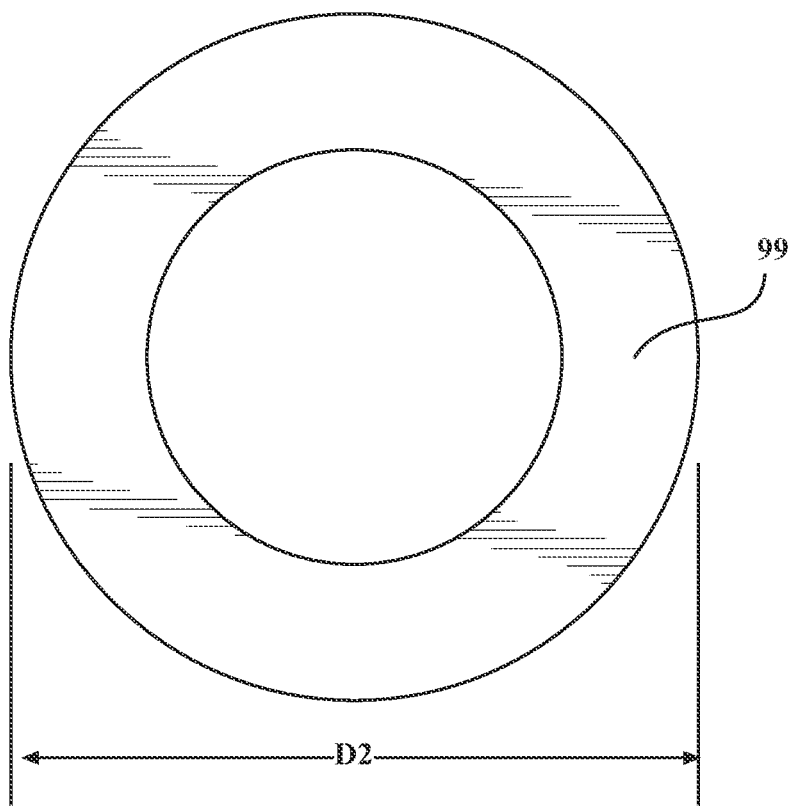
FIG. 7 is a perspective view of another example of a component in the form of a washer that may be passed through a gauge in accordance with an embodiment described herein.

In one or more arrangements, the key dimension for purposes of the gauge 52 may be an outer dimension of the component (i.e., a dimension measurable along one or more exterior surfaces of the component). In particular arrangements, the component 99 may be a nut and the dimension may be a distance D1 between flats of a nut as shown FIG. 6. In particular arrangements, the component 99 may be a cylindrical component, such as a washer or a grommet, and the dimension may be an outer diameter D2 of the cylindrical component as shown in FIG. 7.

Figure 9:
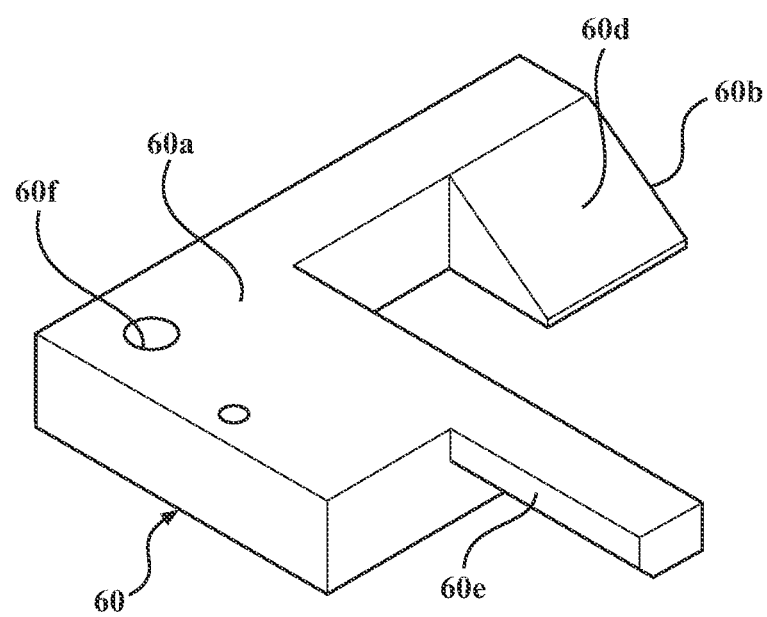
FIG. 9 is a perspective view of a latch in accordance with an embodiment described herein.

Referring to FIG. 9, the latching mechanism 50 may also include a latch 60 operably connected to the gauge 52. The latch 60 may be structured to be rotatable from a latching position to an unlatched position by movement of a component at least partially through the passage 53. The latching position of the latch 60 may be a position or orientation of the latch in which the latch engages the catch 32 to maintain the receptacle lid 26 in a closed condition. The unlatched position of the latch may be a position or orientation of the latch in which the latch is disengaged from the catch 32 so that the receptacle lid 26 is opened or may be opened.

In one or more arrangements, the latch 60 may include a base portion 60a and a first projection 60b extending from the base portion in a first direction. The first projection 60b may be structured to engage the catch 32 to maintain the lid 26 in a closed position when the latch 60 is in the latching position. An end of the first projection 60b may have a ramped surface 60d formed thereon to provide a lead-in surface to facilitate re-engagement with the catch 32 when the receptacle lid 26 is closed again after being opened.

A second projection 60e may also extend from the base portion 60a in the first direction. The second projection 60e may be structured to be contacted by the component 99 as the component moves at least partially through the gauge passage 53.

A through-hole 60f may be formed in the base portion 60a to enable rotatable mounting of the latch 60 to the mounting base 24 as shown in FIG. 1A.

Referring again to FIG. 1A, the latching mechanism may include a spring member 61 (such as a coil spring, for example) operably connected to the latch 60 and structured to spring-load the latch so as to bias the latch toward the latching position. The spring member 61 may have a first end attached to the latch 60 and a second end attached to the mounting base 24. Ends of the spring member 61 may be attached to respective locations on the latch 60 and mounting base 24 selected to spring load the latch, so that the latch is biased toward the latching position shown in FIGS. 1A, 1B, and 3. Thus, the latch 60 is designed to automatically return to the latching position after the component 99 has passed through the gauge passage 53 and contacted the latch 60 to rotate in direction R1 the latch to the unlatched position.

In one or more arrangements, the latching mechanism 50 may include a component transport conduit 63 structured to receive a component 99 exiting the gauge passage 53 from the passage second end 53b and to direct the component from the gauge into the receptacle 22. The component 99 may be directed into the receptacle by guiding the component under force of gravity from the gauge passage second end 53b into the receptacle. In particular arrangements, the component transport conduit 63 is in the form of a flexible hollow tube. In other arrangements, the component transport conduit is in the form of a channel section or an angle iron section.

In one or more arrangements, a push rod 65 may be provided to enable a user to exert a force on the component 99 when the component is in the receiving slot 54a. The push rod 65 may have a user-grippable handle 65a and a component contact portion 65b extending from the handle 65a. The push rod 65 may have at least one hard stop 65s affixed to the contact portion 65b in a position specified so that further travel of the contact portion into the passage 53 is prevented when the contact portion 65b has pushed the component 99 through the passage and before any portion of the contact portion 65b extends outside the passage second end 53b. This ensures that only a correctly-sized component 99 has the ability to contact the latch second projection 60e and cause the latch 60 to rotate in direction R1 to the unlatched position. The push rod embodiment shown in the drawings includes a pair of hard stops 65s, with a first hard stop attached to an upper surface of the contact portion 65b and a second hard stop attached directly below the first hard stop and to a lower surface of the contact portion. The hard stop(s) 65s may be attached to the contact portion using any suitable method, such as welding or adhesive attachment. In one or more arrangements, the hard stop(s) may be in the form of sample(s) of the component 99 intended to be stored in the receptacle 22. This may aid in identification of the component that is currently stored in the receptacle, for purposes of comparison with a sample of the component that is to be tested for passage through the gauge.

FIGS. 1B, 3, 4 and 5 illustrate operation of the latching mechanism 50. As previously described, the latching mechanism gauge 52 may be structured to enable a component 99 having certain dimensions to enter and pass through the gauge passage 53, and to guide an acceptable component from the second end 53b of the passage 53 into the receptacle 22 after the component has moved along the passage 53 and through the gauge 52. In this respect, at least the latching mechanism gauge 52 may be tailored to a particular component desired to be stored in the receptacle 22. As a result, the gauge 52 may serve to screen out or exclude components which do not have the required dimensions and, therefore, which are not intended to be stored in the receptacle 22.

Figure 3:
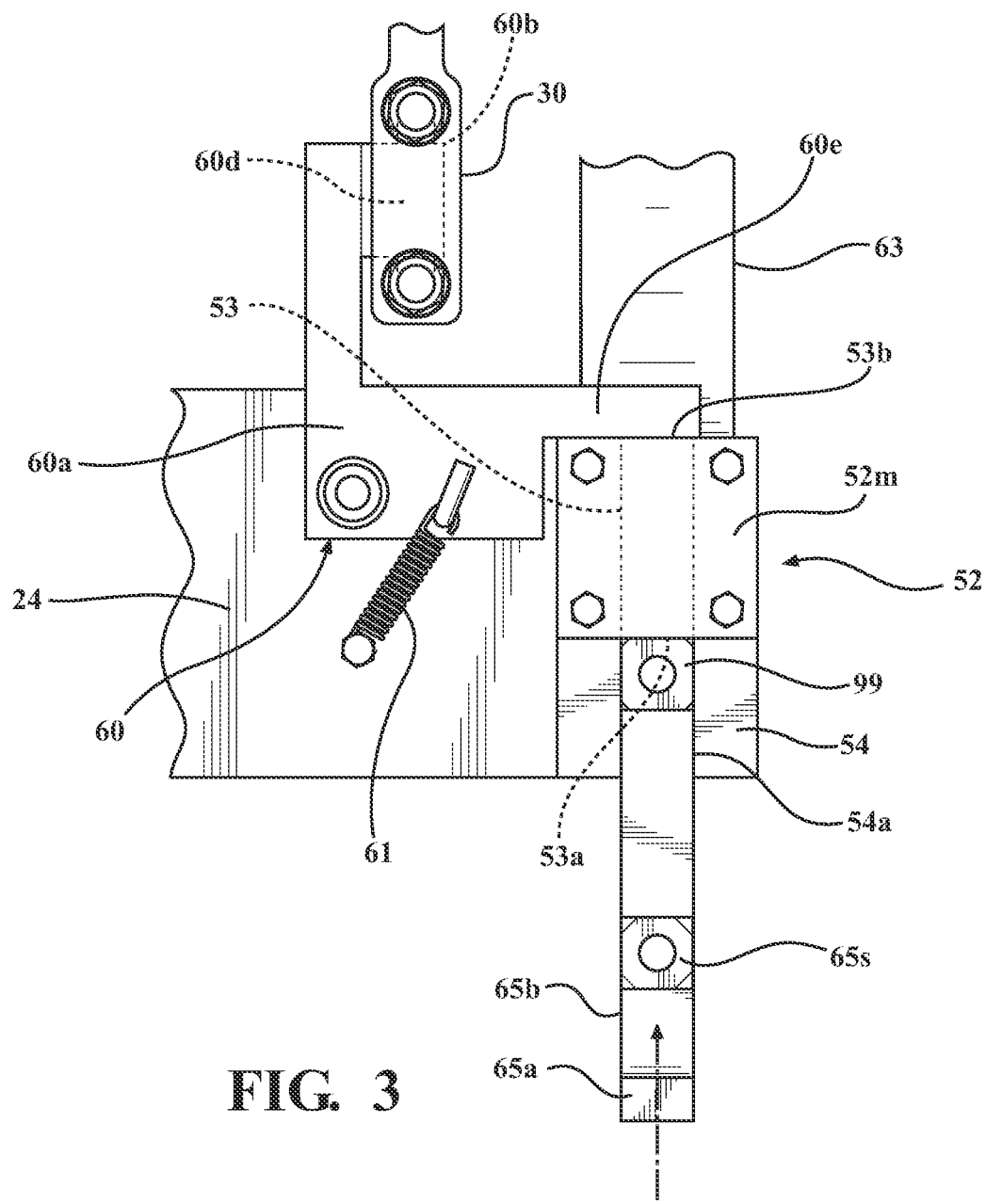
FIG. 3 is another schematic plan view of the portion of the receptacle assembly shown in FIG. 1B, showing an example of how a component is prevented from passing through the gauge when one or more key dimensions of the component lie outside predetermined limits.

Referring to FIGS. 1B and 3, a user may attempt to position a component 99 in the receiving slot 54a. If the component width dimension exceeds the maximum permissible dimension W1 as defined by the width of the receiving slot 54a, then the component 99 may not fit inside the receiving slot. Since the component 99 does not fit in the gauge 52, the user knows that the component 99 in question is not to be stored in the receptacle 22 to which that particular embodiment of the latch mechanism 50 is operably connected.

However, if the component width dimension does not exceed the maximum permissible dimension W1 as defined by the receiving slot width, the component width dimension or other pertinent dimension will fit inside the receiving slot. Since the component 99 should fit in the receiving slot 54a without there being excessive space between the component width dimension and the opposed walls of the receiving slot, the user may optionally (visually or by the use of another gauge or other instrumentation) check the width dimension of the component 99 if it is suspected that the component key dimension is undersized for the gauge 52.

The user may then use the push rod 65 to urge the component along the receiving slot until passage first end 53a is reached. If the component height dimension exceeds the maximum permissible height dimension H1 as defined by the receiving height of the passage 53, then the component may be blocked from entry into the passage 53 by the cover 52m. This may serve as an indication that the component in question is not intended to be stored in the receptacle. However, if the component height dimension does not exceed the maximum permissible height dimension H1, the component 99 may be admitted into the passage 53. Then, the user may push the component 99 into the passage first end 53a, through the passage 53, and out of the passage second end 53b. The push rod contact portion 65b may be inserted into the passage 53 until the hard stop 65s contacts the edge 54e of the gauge receiving member 54, by which time the component 99 has been pushed through the passage 53 without the contact portion 65b extending outside the passage second end 53b.

Figure 4:
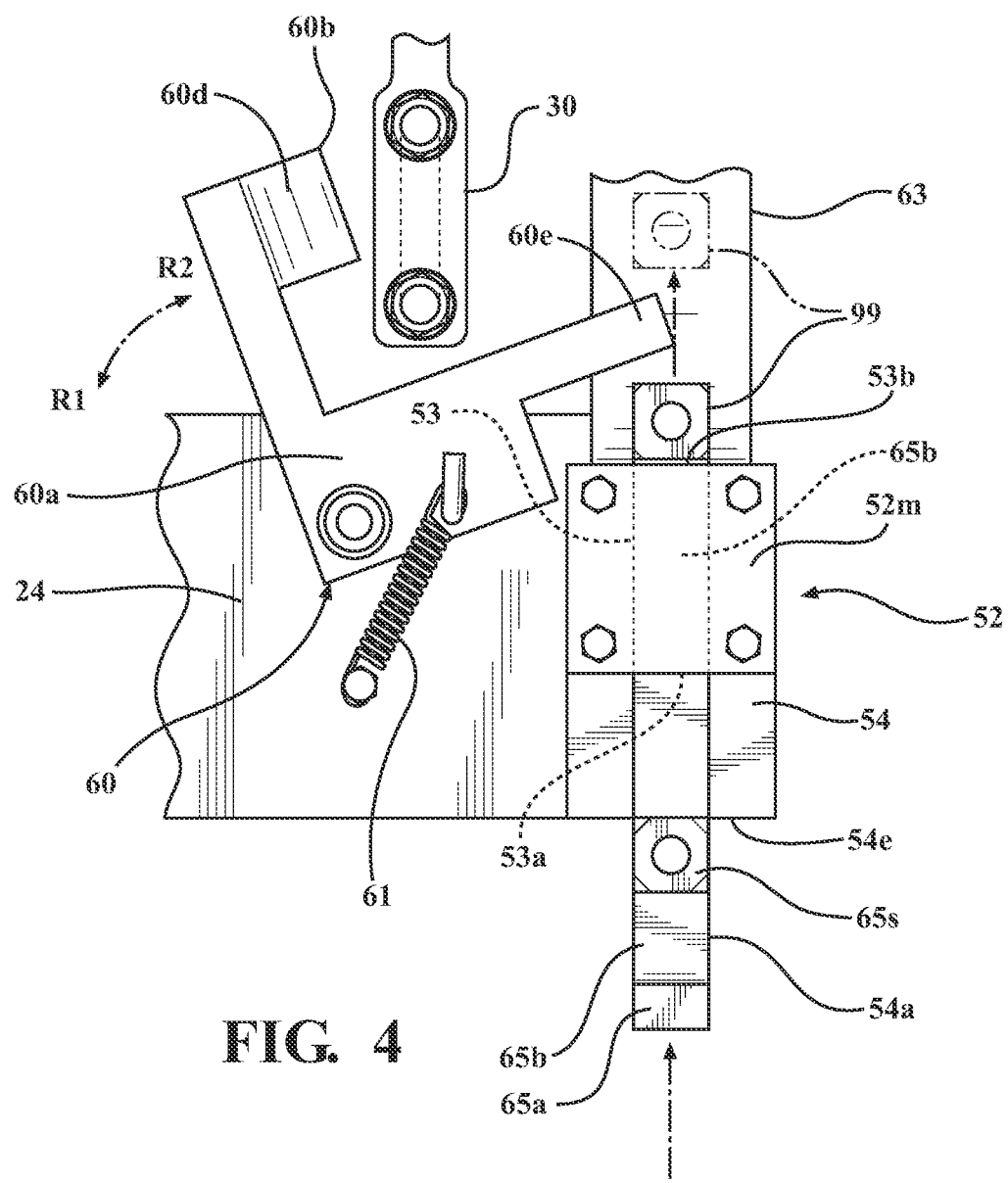
FIG. 4 is the schematic plan view of FIG. 3 showing an example of how passage of a component through the gauge operates to rotate the latch to the unlatched position when one or more key dimensions of the component lie within the predetermined limits.
Figure 5:
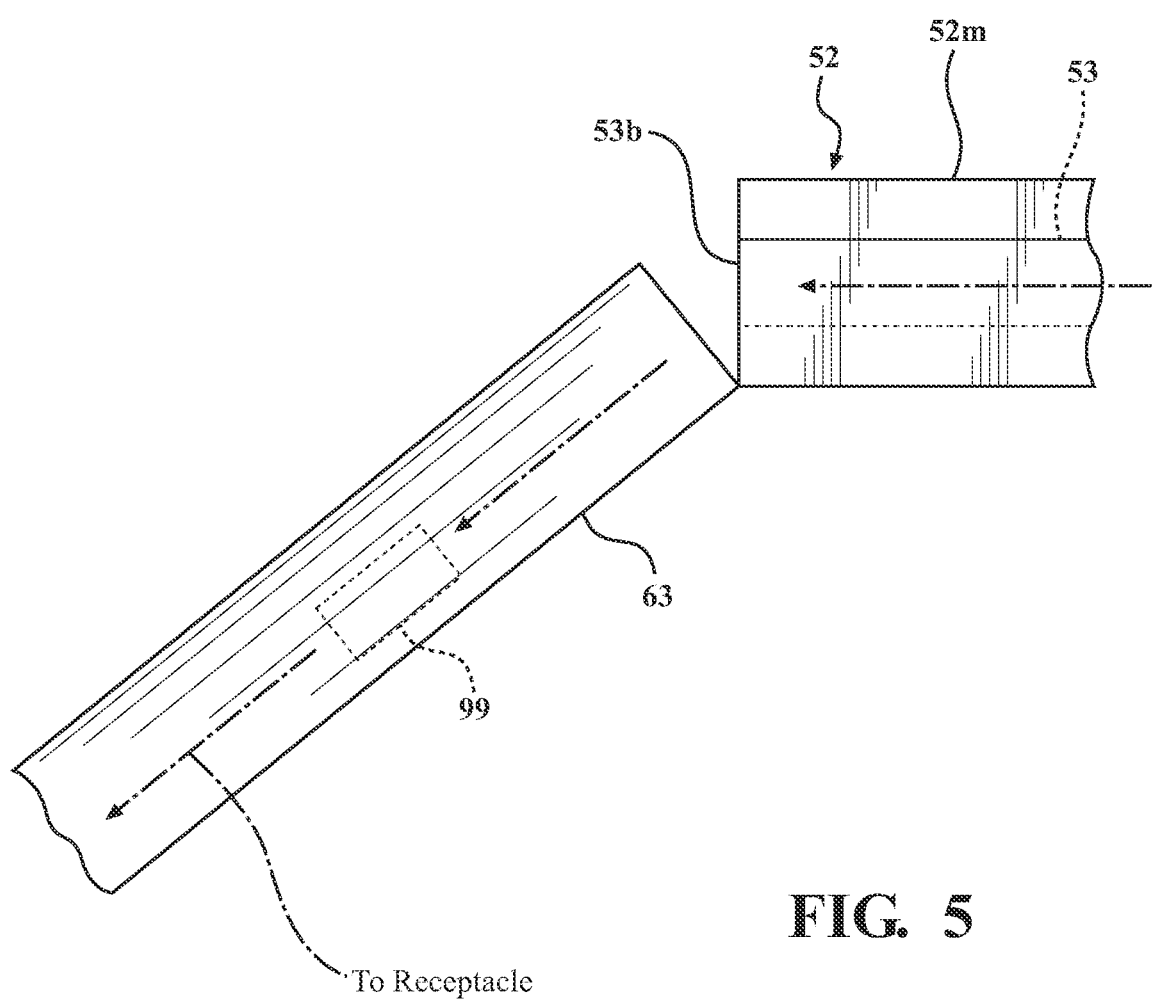
FIG. 5 is a schematic side view of a component transport conduit structured to be connected to a gauge to receive a component having passed through the go-gauge, and to direct the component from the gauge into the receptacle.

Referring to FIG. 4, as the component 99 exits the passage second end 53b, the component pushes on the latch second projection 60e, causing the latch to rotate in direction R1. This brings the latch first projection 60b out of engagement with the catch base portion 32a, releasing the catch and enabling the lid 26 to pop open. The component 99 may then fall from the gauge 52 into the component transport conduit 63 (FIG. 5) to be guided into the receptacle 22.

When the latch second projection 60e is no longer in contact with either the component 99 or the push rod 65, the latch may rotate back in direction R2 to the latching position under the force exerted by the spring member 61.

Referring to FIGS. 1A, 4, and 9, as the lid 26 is closed after opening, the catch base portion 32a may engage and slide along the latch first projection ramped surface 60d, forcing the latch to rotate in direction R1 until the catch base portion 32a passes the latch first projection 60b, at which time the latch automatically rotates back in direction R2 to the latching position under the force of spring 61.

In one or more arrangements, the gauge 52 may be constructed in a modular fashion as a sub-assembly and may be structured to be easily attachable to (and detachable from) the mounting base 24 and the remainder of the latching mechanism 50. This enables the gauge 52 to be easily switched out so that the receptacle can be adapted to store different components.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9A, but the embodiments are not limited to the illustrated structure or application.

Flowcharts and block diagrams (if any) included in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A latching mechanism comprising:
   a gauge defining a passage extending therethrough; and
   a latch operably connected to the gauge and structured to be rotatable from a latching position to an unlatched position by movement of a component at least partially through the passage,
   the latch being structured to engage a latch engagement feature positioned on a lid of a receptacle to maintain the lid in a closed condition when the latch is in the latching position.

2. The latching mechanism of claim 1 wherein the passage has a first end and a second end opposite the first end, wherein the gauge is structured to receive the component into the passage at the first end, and wherein the latch is structured to be rotatable by the component from the latching position to the unlatched position as the component exits the passage at the second end.

3. The latching mechanism of claim 1 wherein the latch is operably connected to a spring structured to spring-load the latch so as to bias the latch toward the latching position.

4. The latching mechanism of claim 1 wherein the latch comprises:
   a base portion;
   a first projection extending from the base portion in a first direction, the first projection being structured to engage a catch operably connected to a lid of the receptacle to maintain the lid in a closed position when the latch is in the latching position; and
   a second projection extending from the base portion in the first direction, the second projection being structured to be contacted by the component as the component moves at least partially through the passage.

5. The latching mechanism of claim 1 wherein the component is a nut.

6. The latching mechanism of claim 1 wherein the component is a cylindrical component.

7. The latching mechanism of claim 1 wherein the passage has a first end and a second end opposite the first end, wherein the latching mechanism further comprises a component transport conduit structured to receive a component exiting the passage from the passage second end and to direct the component from the gauge into the receptacle.

8. The latching mechanism of claim 7 wherein the component transport conduit comprises a flexible hollow tube.

9. A receptacle assembly including a latching mechanism in accordance with claim 1.

10. The receptacle assembly of claim 9 further comprising a spring-loaded lid operably connected to the receptacle and to the latching mechanism, wherein the latch is structured to engage a feature positioned on the lid to maintain the lid in a closed condition when the latch is in the latching position, and wherein the lid is structured to open automatically to enable access to an interior of the receptacle when the latch is rotated to the unlatch position so as to disengage the latch from the feature positioned on the lid.

11. The receptacle assembly of claim 10 wherein the lid is structured so that contents of the receptacle are visible through the lid.

12. The receptacle assembly of claim 10 wherein the lid is formed from a transparent material.

\* \* \* \* \*